(12) United States Patent
Hsieh et al.

(10) Patent No.: US 9,126,455 B1
(45) Date of Patent: Sep. 8, 2015

(54) DIRECTIONAL LOCK WITH RELEASE FOR A PIVOTING CASTER

(71) Applicants: Samuel C. Hsieh, Marlboro, NJ (US); Tsuwei Chu, Middletown, NJ (US)

(72) Inventors: Samuel C. Hsieh, Marlboro, NJ (US); Tsuwei Chu, Middletown, NJ (US)

(\*) Notice: Subject to any disclaimer, the term of this patent is extended or adjusted under 35 U.S.C. 154(b) by 0 days.

(21) Appl. No.: 14/277,943

(22) Filed: May 15, 2014

(51) Int. Cl.
*B60B 33/02* (2006.01)
*B60B 33/00* (2006.01)

(52) U.S. Cl.
CPC .................................. *B60B 33/0078* (2013.01)

(58) Field of Classification Search
CPC ........ B62B 3/02; B62B 3/027; B62B 3/1492; B62B 5/0083; B62B 5/0086; B62B 2301/04; B62B 2301/044; B62B 2301/046; B62B 2301/0463; B62B 2301/04632; B62B 2301/0465; B62B 33/02; B62B 33/023; B62B 33/025; B62B 33/026; B62B 33/028

USPC ............... 280/79.11, 33.991, 33.994, 33.996, 280/47.34, 47.35; 16/18 R, 29, 35 R, 35 D, 16/31 R

See application file for complete search history.

(56) References Cited

U.S. PATENT DOCUMENTS

| | | | |
|---|---|---|---|
| 2,583,858 A | | 1/1952 | Kostolecki |
| 4,205,413 A | * | 6/1980 | Collignon et al. ............ 16/35 D |
| 4,349,938 A | * | 9/1982 | Fontana ........................ 16/35 R |
| 5,040,265 A | | 8/1991 | France et al. |
| 5,263,226 A | | 11/1993 | Roy et al. |
| 5,450,650 A | | 9/1995 | Bertrand et al. |
| 5,797,611 A | * | 8/1998 | Joseph et al. ............ 280/33.991 |
| 6,094,846 A | * | 8/2000 | Feller .............................. 37/270 |
| 8,220,110 B1 | * | 7/2012 | Chen ............................ 16/35 R |

\* cited by examiner

*Primary Examiner* — John Walters
(74) *Attorney, Agent, or Firm* — Cesari and McKenna, LLP (57) ABSTRACT

A directional locking caster convertible between a locked position and an unlocked position by application of a lateral force. Also disclosed are transport devices including the caster. Additionally, a transport device including a directional locking caster that is convertible from a locked position to an unlocked position via a cable release.

19 Claims, 10 Drawing Sheets

DIRECTIONAL LOCK WITH RELEASE FOR A PIVOTING CASTER

BACKGROUND OF THE INVENTION

1. Field of the Invention

This invention relates to directional locking wheel casters.

2. Background Information

A typical shopping cart has four off-center axis wheels; two freely swiveling front wheels and two fixed straight rear wheels. As a result, the shopping cart can be easily turned and moved in a forward direction. However, due to the fixed rear wheels, the shopping cart cannot be easily pushed backward or sideways.

A hospital bed, a medical utility cart, and a luggage trolley typically include four freely swiveling off-center axis wheels. These transport items can be pushed in any direction, e.g., forward, backward and sideways. However, as all four wheels are free to swivel, these transport items are hard to maneuver in a straight direction while being pushed. They tend to swing to the left or right uncontrollably. For example, a hospital bed is routinely moved by two people; one in front to guide the front end in the desired direction and one in back to push it forward.

Attempts have been made to solve the above-described problems by employing a locking caster. See for example, U.S. Pat. Nos. 2,583,858; 5,040,265; and 5,263,226. The casters described in these patents have one or more deficiency rendering them unsuitable for solving the design problem. The deficiencies include (i) a locking mechanism that swivels together with the wheel, rendering the locking mechanism susceptible to physical damage, (ii) a spring exerting a constant pressure against the rotation wheel, resulting in premature wear of the wheel surface and failure of the locking mechanism if the wheel surface is not clean, and (iii) an unlocking mechanism that requires reversing direction of the wheel rotation.

The need exists for an improved directional locking caster to overcome the drawbacks of existing caster designs.

SUMMARY OF THE INVENTION

To address the needs discussed above, a directional locking caster having a locked position and an unlocked position is disclosed. The directional locking caster in the locked position can be converted to the unlocked position by application of a lateral force.

The directional locking caster has a wheel assembly including a wheel including a wheel axle and a fork for supporting the wheel axle, the fork having an upper end and a lower end, the wheel axle being affixed to the lower end and a circular ring being affixed to the upper end, the circular ring including a detent.

Also included in the directional locking caster is a thrust bearing assembly having a central opening, the thrust bearing assembly including an outer bearing ring and an inner bearing ring, the outer bearing ring having a mounting member protruding therefrom.

In addition, the directional locking caster includes a vertical retention member extending through the central opening of the thrust bearing assembly, the vertical retention member defining a vertical axis, the vertical axis being perpendicular to and offset horizontally from the wheel axle; and a locking device including a tubular housing having a first end and a second end, the first end and the second end defining an axis therebetween, a ball socket at the first end and a tension adjusting plug positioned at the second end, a tensioning rod within the tubular housing, the tensioning rod having a proximal end and a distal end, and a locking ball in contact with the proximal end of the tensioning rod and extending through the ball socket.

The fork is rotatably connected to the vertical retention member, the locking device is mounted on the mounting member such that the locking device extends in a direction away from the vertical retention member and the axis is perpendicular to the vertical axis, the locking ball reversibly engages the detent in the circular ring, and, in the locked position, the fork cannot rotate about the vertical retention member.

Also disclosed is a transport device including a platform and one or more of the directional locking caster described above. The directional locking caster is fastened to the platform via the vertical retention member and the locking device is configured such that application of a lateral force to the wheel converts the directional locking caster from the locked position to the unlocked position.

Additionally, a transport device is provided that includes a platform and one or more directional locking caster described above, the directional locking caster being fastened to the platform via the mounting member and the locking device is configured such that application of a lateral force to the wheel converts the directional locking caster from the locked position to the unlocked position.

The details of one or more embodiments of the invention are set forth in the description and the examples below. Other features, objects, and advantages of the invention will be apparent from the detailed description, the figures, and the claims. All publications and patent documents cited herein are incorporated by reference in their entirety.

BRIEF DESCRIPTION OF THE DRAWINGS

The invention description below refers to the accompanying drawings, of which.

DETAILED DESCRIPTION

As mentioned above, a directional locking caster disclosed herein has a locked position and an unlocked position. In the locked position, the locking ball is engaged in the detent in the circular ring such that the wheel assembly cannot freely rotate about the vertical retention member. The wheel assembly, in the locked position, is oriented such that the wheel axle is perpendicular to the axis of the locking device and is offset horizontally from the vertical axis defined by the vertical retention member in a direction away from the locking device. When installed on a cart or other transport device, the wheel, in the locked position, is oriented in the direction of movement parallel to an edge of the cart.

The locking device is configured such that application of a lateral force to the wheel converts the directional locking caster from the locked position to the unlocked position. In the unlocked position, the locking ball is not engaged in the detent in the circular ring, allowing for the wheel assembly to freely rotate about the vertical retention member. This feature facilitates steering and maneuvering of a cart utilizing the directional locking casters described herein. When the wheel assembly rotates to a degree such that the locking ball is again aligned with the detent, the locking ball will re-engage the detent, thereby locking the wheel assembly and preventing free rotation.

As mentioned above, in the locked position, the locking ball, which extends through the ball socket, is engaged in the detent in the circular ring. The locking ball is held in position against the ball socket by the tensioning rod, which, in turn, is pushed against the locking ball by a tension spring. The force applied by the tension spring against the tensioning rod can be adjusted via the tension adjusting plug. In an embodiment, the tension adjusting plug includes threads which engage complementary threads in the tubular housing of the locking device. Tightening the tension adjusting plug pushes it against the tension spring, thereby compressing the tension spring, resulting in a greater force applied to the tensioning rod and, in turn, the locking ball.

The amount of tension can be selected depending upon what type of cart the directional locking caster is mounted on and the expected weight of material being moved in the cart. For example, the tension can be set high if the expected load is heavy. This prevents accidental unlocking of the directional locking caster if the cart begins to drift sideways while being pushed.

Aside from the tension adjustment, the sensitivity of the locking device also depends upon the degree to which the locking ball engages the detent. The larger the surface area of the locking ball in contact with the detent, the greater the lateral force required to unlock the locking device. In this connection, the locking ball extends through the ball socket by a distance less than 0.5 times the diameter of the locking ball. For example, the locking ball can extend through the ball socket by a distance equal to 0.1, 0.2, 0.3, and 0.4 times the diameter of the locking ball.

Figure 6A:
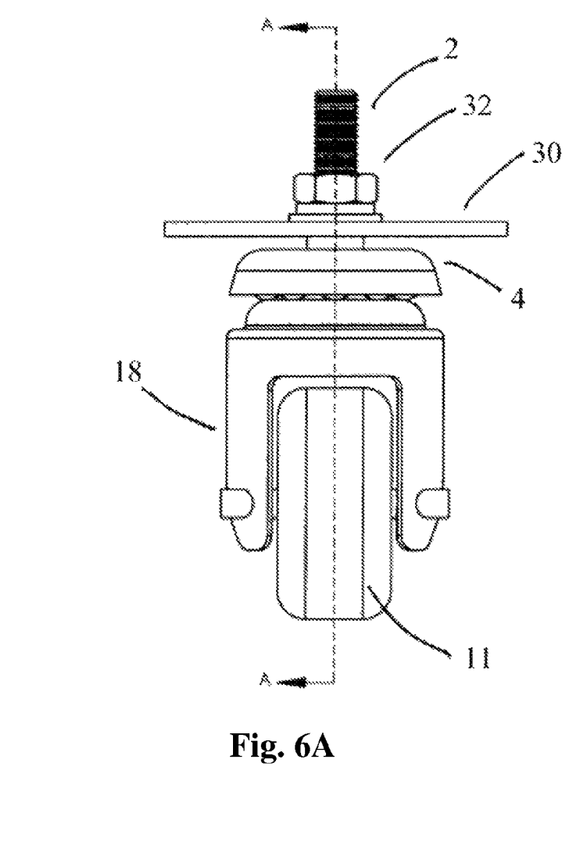
FIG. 6A is a head-on view of an exemplary embodiment of a directional locking caster attached to a transport platform via a vertical retention member.
Figure 6B:
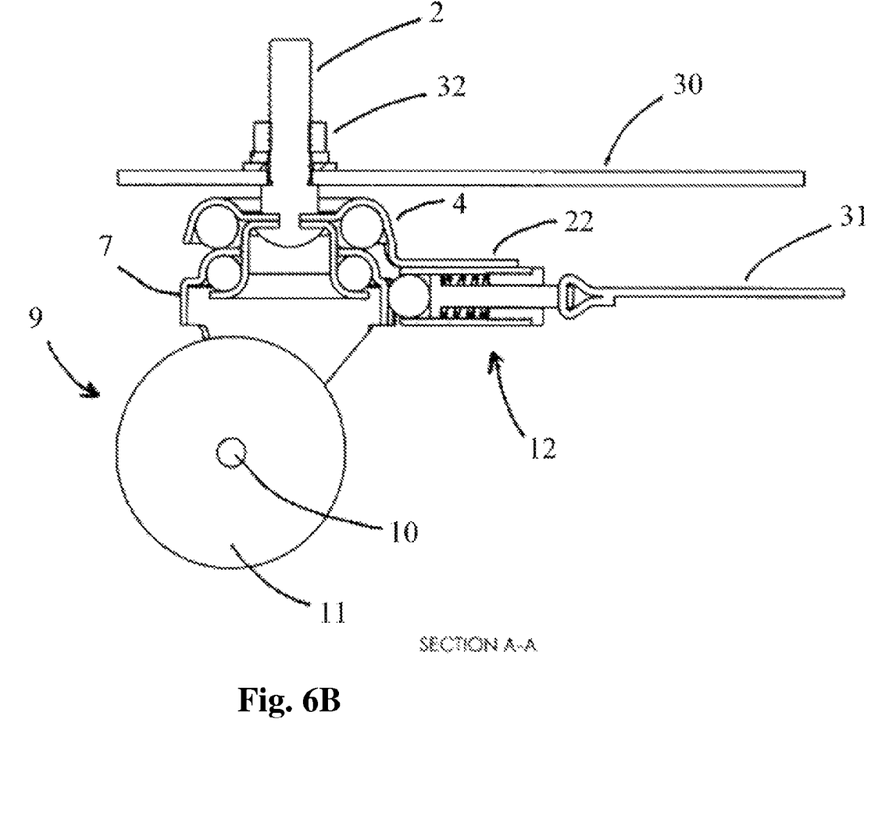
FIG. 6B is a side view of the exemplary embodiment of a directional locking caster of FIG. 6A.
Figure 7A:
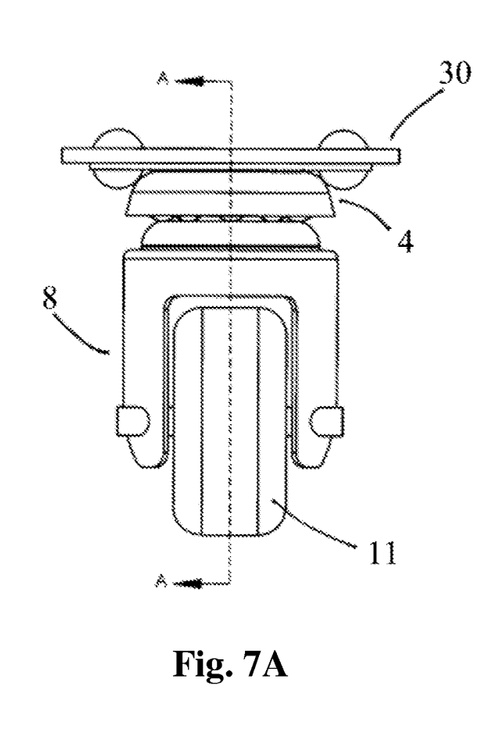
FIG. 7A is a head-on view of an exemplary embodiment of a directional locking caster attached to a transport platform via a mounting member.
Figure 7B:
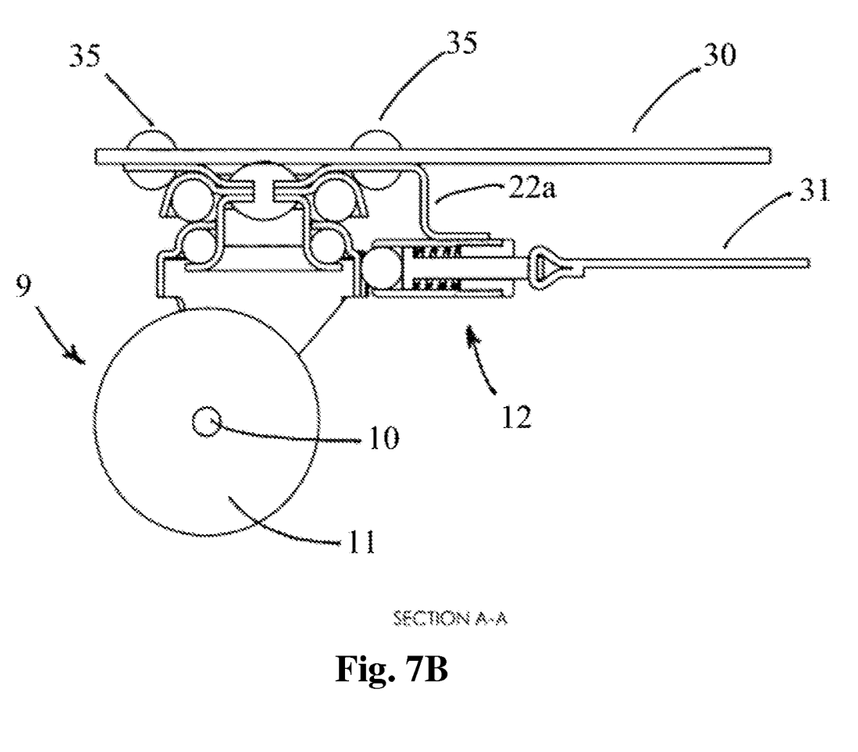
FIG. 7B is a side view of the exemplary embodiment of a directional locking caster of FIG. 7A.
Figure 8A:
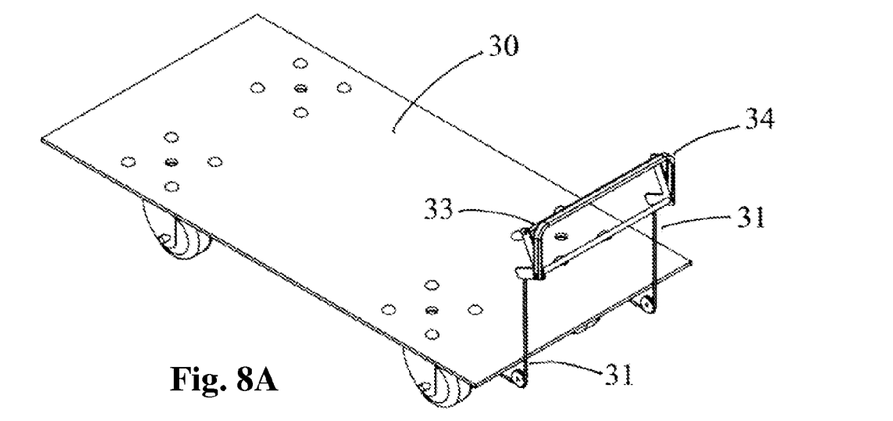
FIG. 8A is an overhead three-quarter view of an exemplary transport platform having a cable release bar and release cable.
Figure 8B:
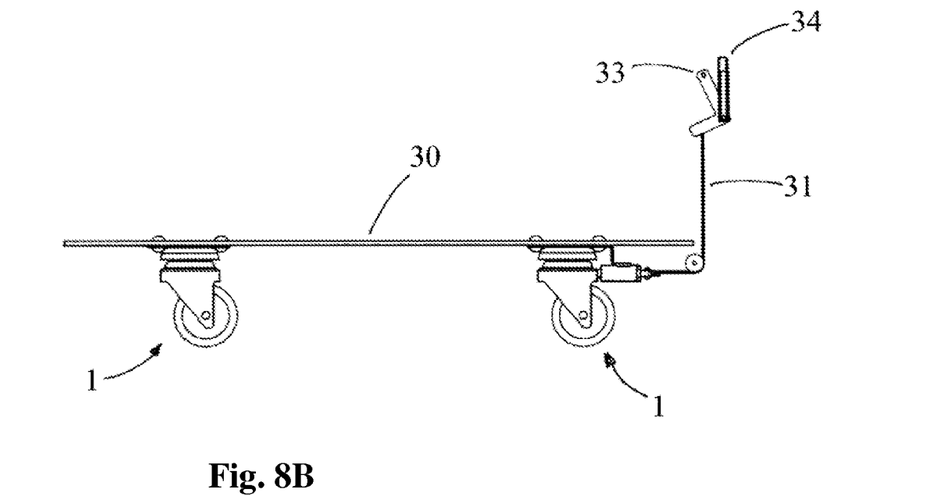
FIG. 8B is a side view of the exemplary transport platform of FIG. 8A.
Figure 9A:
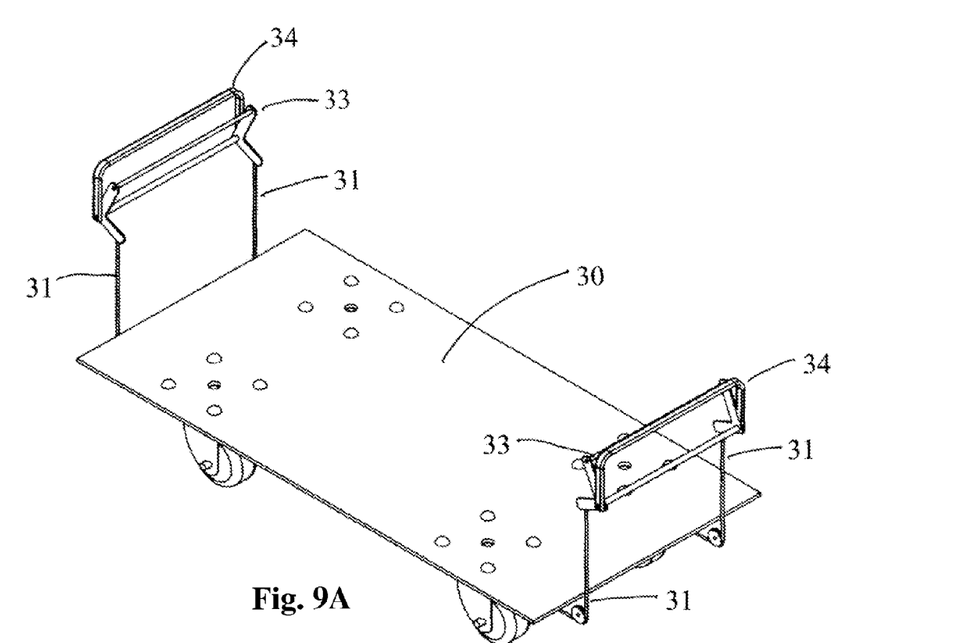
FIG. 9A is an overhead three-quarter view of an exemplary transport platform having two cable release bars and two release cables.
Figure 9B:
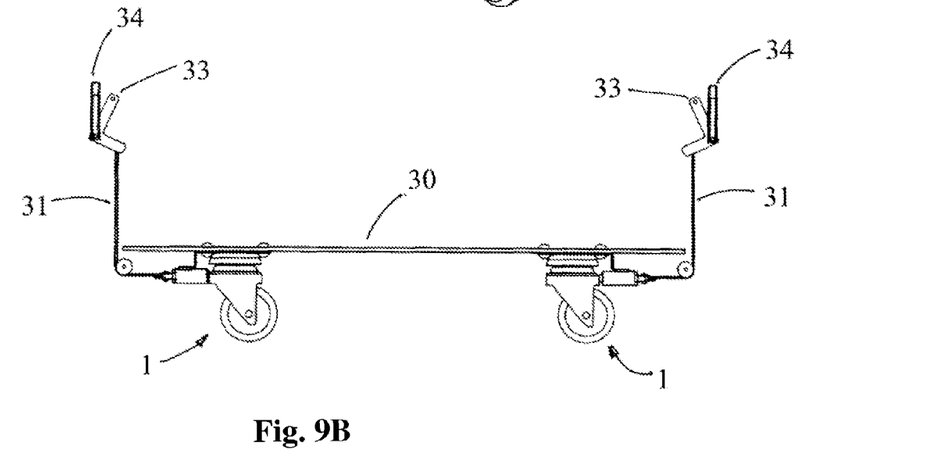
FIG. 9B is a side view of the exemplary embodiment of the exemplary transport platform of FIG. 9A.

The directional locking caster described above can be included as part of a transport device, such as a shopping cart, a luggage trolley, a medical utility cart, and a hospital bed. One or more directional locking caster can be mounted to the bottom (platform 30 in FIGS. 6A, 6B, 7A, 7B, 8A, 8B, 9A, and 9B) of the transport device. For example, a directional locking caster can be mounted via the vertical retention member to each of four bottom corners of a transport device. The vertical retention member in this example can be a threaded rod that extends through an opening in the bottom of the transport device and is secured by a nut (32 in FIG. 6A and FIG. 6B).

Alternatively, the directional locking caster can be mounted to the transport device via the mounting member. In this embodiment, the mounting member is provided with through holes to accept mounting bolts (35 in FIG. 7A and FIG. 7B) which extend through holes in the bottom of the transport device, where they can be secured by nuts. The wheel assembly is attached to the mounting member via the vertical retention member.

The transport devices described above can be generally square or rectangular and can include four directional locking casters each being fastened proximate a different corner of the transport device. The directional locking casters are aligned such that the detents of all four directional locking casters face the same direction, and the locking devices extend towards the center of the transport device.

As mentioned above, the directional locking caster can be converted from the locked position to the unlocked position by applying a lateral force. In an alternative embodiment, the transport device includes a cable release for manually unlocking the directional locking caster. The cable release mechanism includes a cable release bar and a release cable. The release cable is connected at one end to the cable release bar and at the other end to the locking device. More specifically, the cable is attached to an eyelet in the tensioning rod. Actuating the cable release bar pulls the release cable which in turn pulls the tensioning rod away from the locking ball. This results in a reduction in the force of the locking ball against the detent, allowing for facile unlocking of the directional locking casters.

The cable release bar 33 can be mounted near a handle 34 used for pushing the transport device. For example, a typical shopping cart has a single handle 34 for pushing it. A cable release bar 33 can be mounted parallel to the single handle 34 such that it can be actuated easily by squeezing it against the single handle 34.

In other embodiments, the cable release bar can be mounted to the side or the bottom of the transport device. For example, a hospital bed can have the cable release bar mounted to the underside of one end of the bed, such that an individual pushing the bed can reach and actuate the cable release. Alternatively, the hospital bed can have two cable release bars, one at each end of the bed. In this arrangement, if the bed is being moved by two individuals, either one can actuate the cable release bar to unlock the directional locking casters.

Without further elaboration, it is believed that one skilled in the art can, based on the disclosure herein, utilize the present invention to its fullest extent. The following specific embodiments are, therefore, to be construed as merely descriptive, and not limitative of the remainder of the disclosure in any way whatsoever.

Figure 1A:
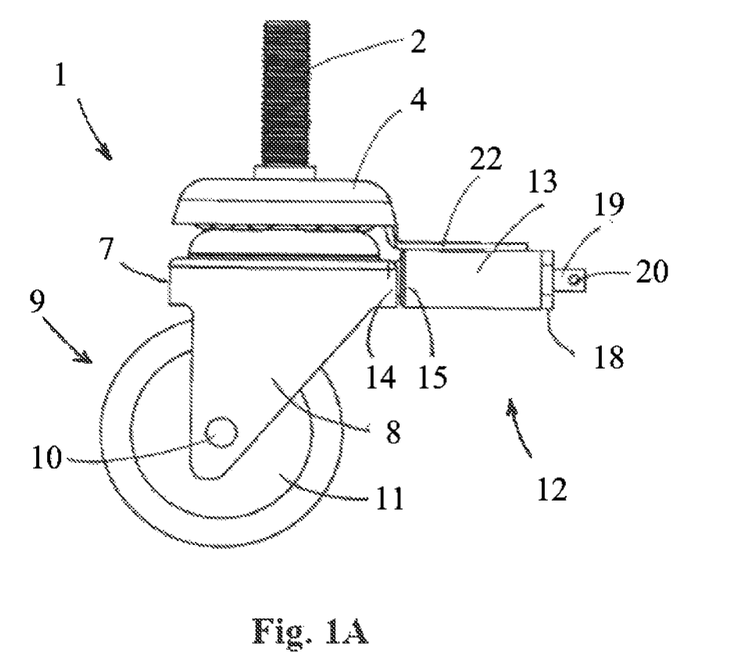
FIG. 1A is a side view of an exemplary embodiment of a directional locking caster.
Figure 1B:
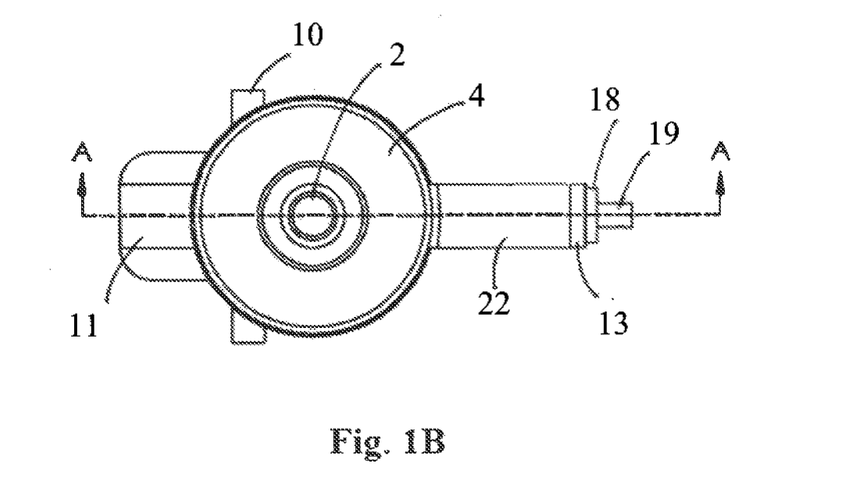
FIG. 1B is a top view of the directional locking caster of FIG. 1A.
Figure 1C:
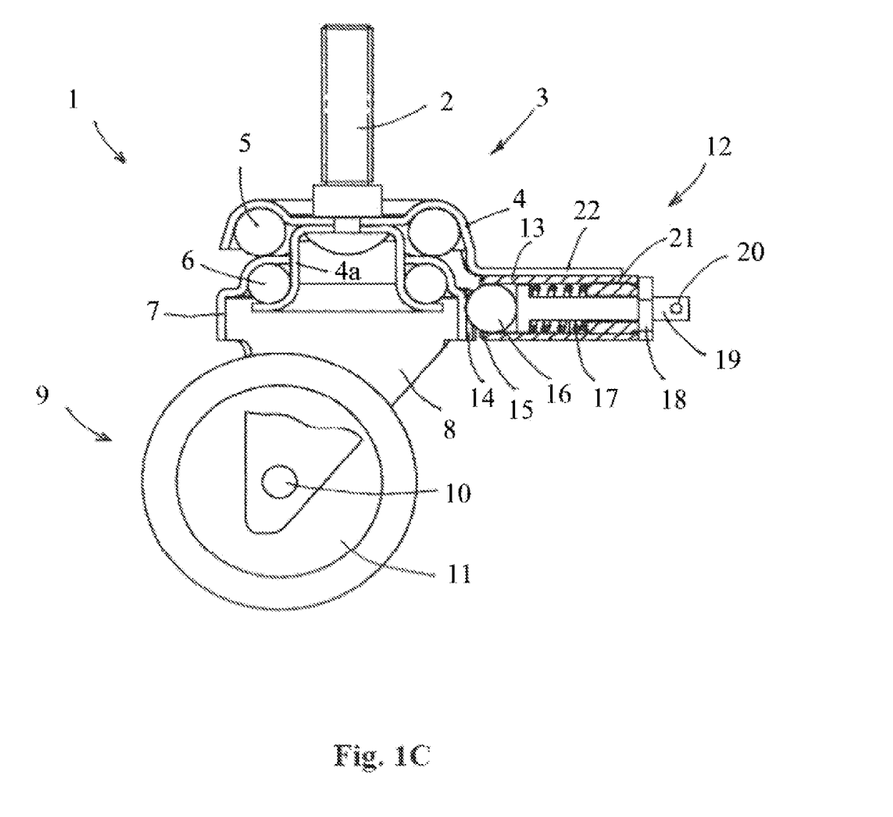
FIG. 1C is a cross-sectional side view of the directional caster of FIG. 1A.
Figure 2A:
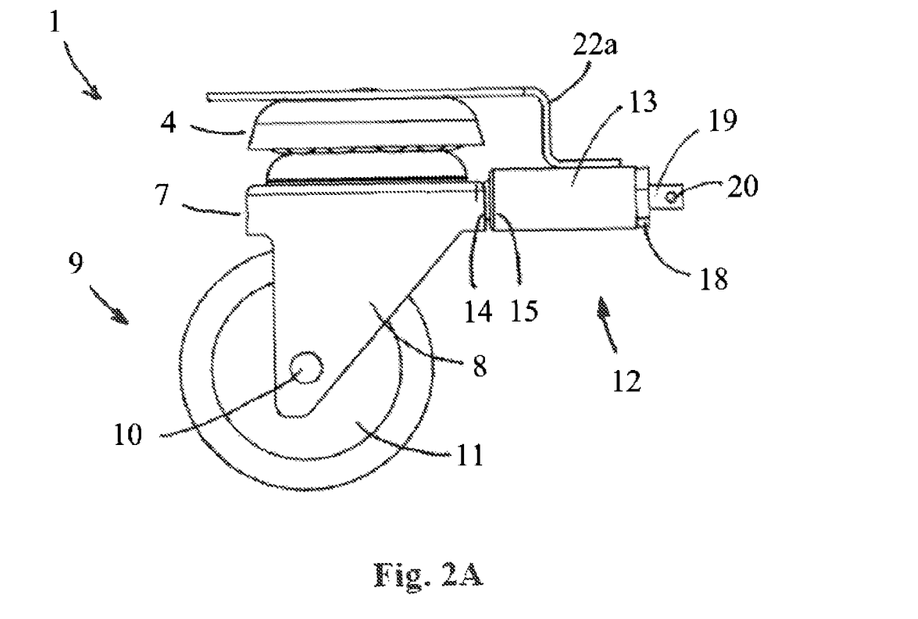
FIG. 2A is a side view of an alternative embodiment of a directional locking caster.
Figure 2B:
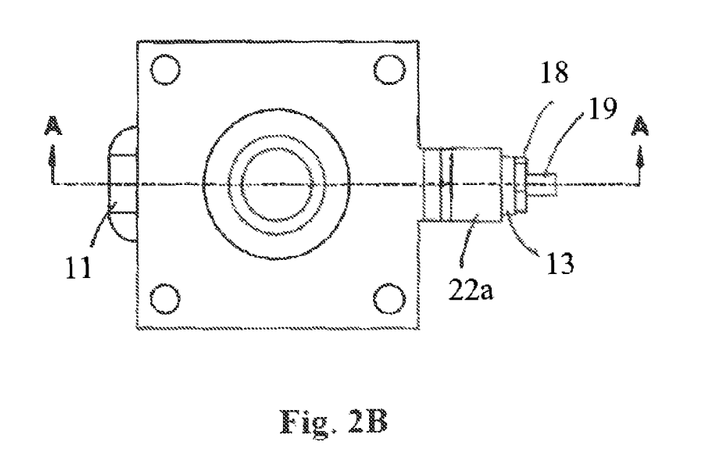
FIG. 2B is a top view of the directional locking caster of FIG. 2A.
Figure 2C:
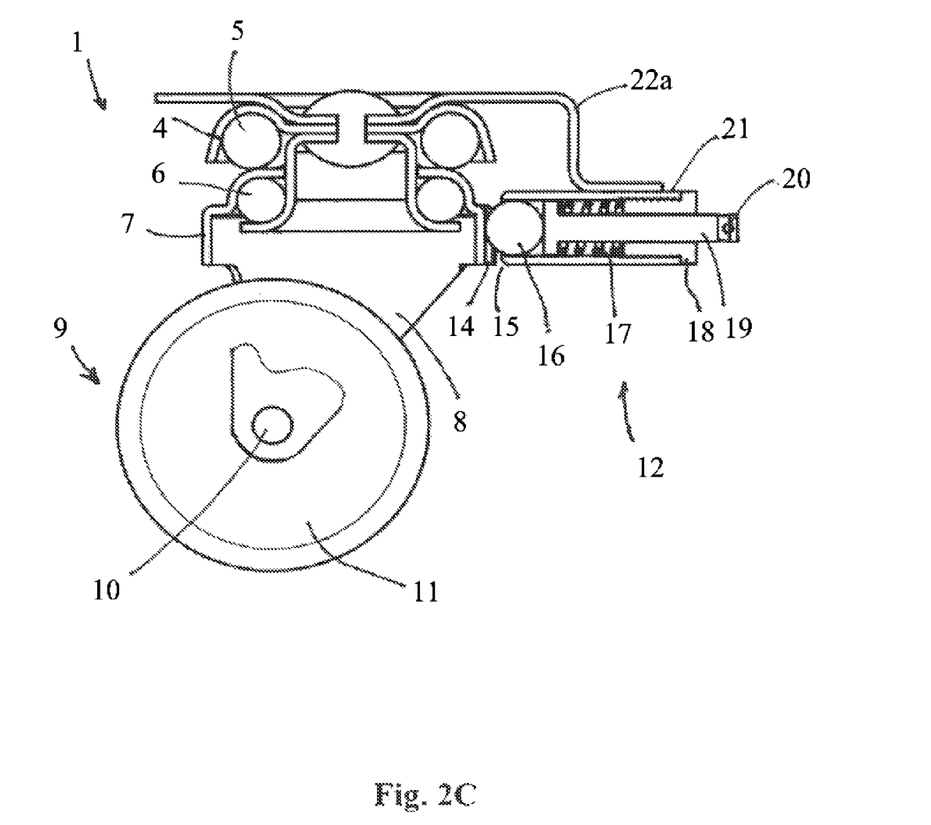
FIG. 2C is a cross-sectional side view of the directional caster of FIG. 2A.

Referring to FIGS. 1A, 1B, and 1C, the directional locking caster 1 contains a vertical retention member 2, a thrust bearing assembly 3, a wheel assembly 9, and a locking device 12.

The wheel assembly 9 includes a wheel 11, a wheel axle 10, and a wheel fork 8. The ends of axle 10 are supported by the wheel fork 8. A circular ring 7 including a detent 14 is attached to the upper part of the wheel fork 8. The wheel fork 8 is able to swivel around the vertical retention member 2 that extends through the thrust bearing assembly 3 substantially at a right angle to the wheel axle 10 of the wheel 11.

The upper end of the fork joint 8 is fastened by means of the thrust bearing assembly 3 to the lower end of the vertical retention member 2. A center axis of the vertical retention member 2 is laterally offset in relation to the vertical plane passing through the wheel axle 10 supporting the wheel 11. This offset arrangement induces the wheel assembly 9 to swivel around the vertical retention member 2 such that the wheel axle 10 is laterally offset in a direction away from the direction of travel.

The thrust bearing assembly 3 includes an outer bearing ring 4 and an inner bearing ring 4a, both of which are fixedly mounted to the vertical retention member 2. A plurality of roller bearings 6 are seated between the inside of the circular cover 7 and the outer surface of the inner bearing ring 4a. A second plurality of roller bearing 5 are seated between the outer bearing ring 4 and both the inner bearing ring 4a and the top of the circular ring 7. The thrust bearing assembly allows for free rotation of the wheel assembly about the vertical retention member 2 if the directional locking caster 1 is not in the locked position.

Figure 3A:
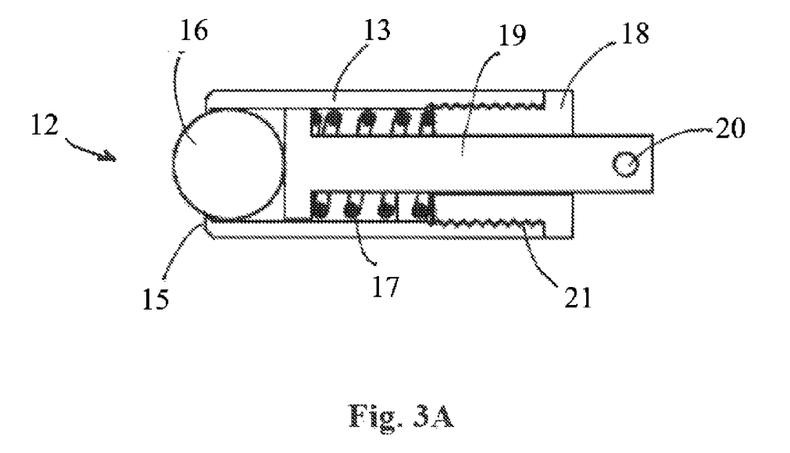
FIG. 3A is a cross-sectional side view of an exemplary locking device.
Figure 3B:
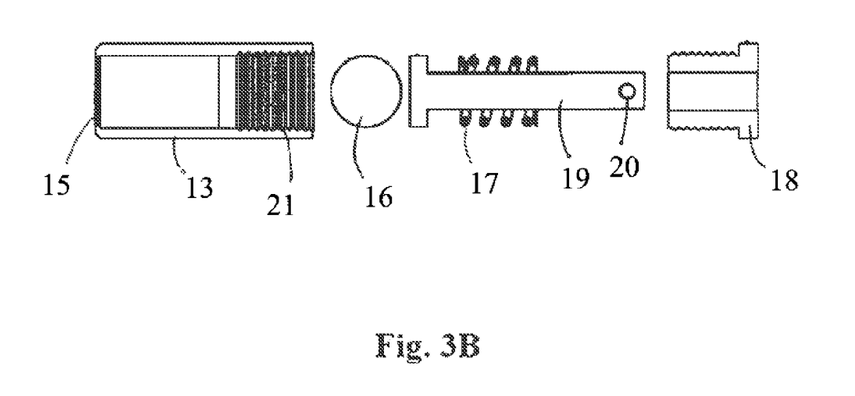
FIG. 3B is an exploded view of the locking device of FIG. 3A.

As mentioned above, the directional locking caster 1 includes a locking device 12. Making reference to FIGS. 1A, 1B, 1C, 2A, 2B, and 2C, the locking device 12 is affixed to a mounting member 22 or 22a which extends from the outer bearing ring 4. As depicted in FIGS. 3A and 3B, the locking device 12 includes a tubular housing 13, a locking ball 16, a tensioning spring 17, a tensioning rod 19, and a tension adjusting plug 18. A ball socket 15 is attached to one end of the tubular housing 13. The ball socket 15 has an opening smaller in diameter than the locking ball 16 such that the locking ball 16 can extend out of the ball socket and make contact with the circular ring 7. The locking ball 16 is pushed against the ball socket 15 by a tensioning rod 19 within the tubular housing 13 of the locking device 12. The tensioning rod 19 extends through a tension adjusting plug 18 at the end of the tubular housing 13 opposite that of the ball socket 15. A tension spring 17 located between the tensioning rod 19 and the tension adjusting plug 18 provides a force to push the tensioning rod 19 against the locking ball 16 to hold it against the circular ring 7. Optionally, the amount of tension exerted by the tension spring can be adjusted by altering the position of the tension adjusting plug 18. In this connection, the tension adjusting plug 18 and the end of the tubular housing can both be threaded such that the tension adjusting plug 18 can be advanced or retracted from the tubular housing via the threads, thereby increasing or decreasing the force exerted by the tension spring 17 against the tensioning rod 19.

Figure 4A:
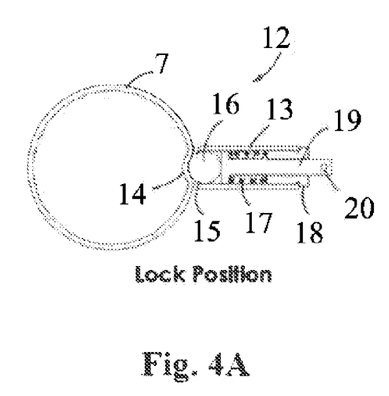
FIG. 4A is a cross-sectional top view of a directional locking caster in the locked position.

Referring to FIGS. 1C and 4A, in the locked position, the locking ball 16 of the locking device 12 extends through the ball socket 15 to engage the detent 14 of the circular ring 7. The pressure of the locking ball 16 against the detent 14 of the circular ring 7 prevents the wheel assembly 9 from rotating about the vertical retention member 2. In the locked position, the locking ball 16 can extend through the ball socket 15 a distance of ⅓ of the diameter of the locking ball 16 to engage the detent 14, thereby locking the wheel assembly 9.

Figure 4B:
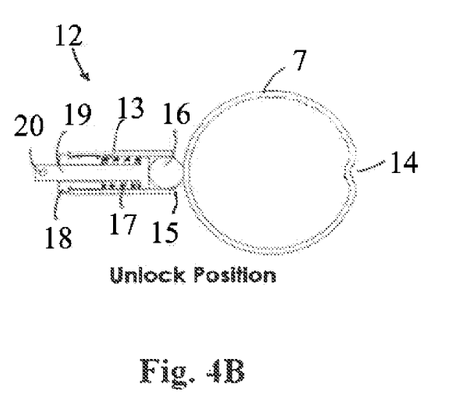
FIG. 4B is a cross-sectional top view of a directional locking caster in the unlocked position.

FIG. 4B depicts the unlocked position, in which the locking ball 16 is not engaged in the detent 14 in the circular ring 7. The amount of pressure exerted by the locking ball 16 against the circular ring 7 is not sufficient to inhibit the rotation of the wheel assembly 9 about the vertical retention member 2.

As set forth above, the amount of tension applied to the locking ball 16 is adjustable via the tension adjusting plug 19. Advantageously, the tension can be adjusted such that application of a lateral force to the wheel assembly 9 in the locked position is sufficient to disengage the locking ball 16 from the detent 14, thereby transitioning the wheel assembly 9 from the locked to the unlocked position. The lateral force applied to the wheel assembly 9 results in a force pushing the locking ball 16 against the tensioning rod such that the locking ball recedes through the ball socket 15 and disengages from the detent 14.

In a particular embodiment, a transport device (e.g., a shopping cart, a luggage trolley, a medical utility cart, and a hospital bed) can have four directional locking casters 1 each mounted to the cart at a different corner via the vertical retention member 2. See FIG. 1A. Alternatively, the directional locking casters can be attached to the cart via the mounting member 22a. See FIGS. 2A and 2B.

Figure 5:
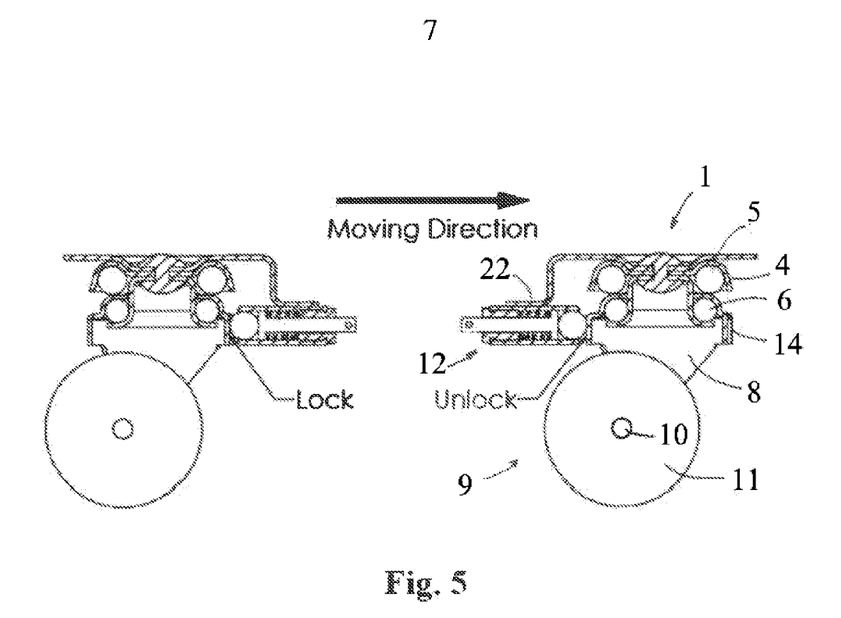
FIG. 5 is illustrative of the locked or unlocked position of two directional locking casters in relation to a direction of movement.

As depicted in FIG. 5, beginning with all of the directional locking casters 1 in the unlocked position, pushing the cart straight results in the rotation of all four directional locking casters 1 into a straight position. The directional locking casters 1 are mounted in pairs such that the two front-mounted directional locking casters 1 remain in the unlocked position and the two rear-mounted directional locking casters 1 rotate to the locked position. A cart having the directional locking casters 1 arranged in this way can easily be pushed and steered in a desired direction.

If the cart is pushed in the opposite direction from that described immediately above, a lateral sideways force is thus applied to the off-center wheel assembly 9. In the case of the directional locking casters 1 that were in the locked position, the lateral force overcomes the force of the tension spring 17 and pushes the locking ball 16 out of the detent 14, thus transitioning the directional locking casters 1 to the unlocked position. Oppositely, the wheel assembly 9 in the unlocked directional locking casters 1 can swivel about the vertical retention member 2 until the locking ball 16 engages the detent 14, thereby locking the directional locking casters 1.

A lateral sideways force can be applied, for example, by pushing the cart at an angle away from the direction of motion. The amount of lateral force necessary to unlock the locking device can be 25 N to 500 N (e.g., 25 N, 50 N, 100 N, 200 N, 300 N, 400 N, and 500 N). As mentioned above, the amount of lateral force required to unlock the locking device 12 can be adjusted via the tension adjusting plug 19.

Importantly, if the cart is pushed sideways, all four off-center wheel assemblies 9 swivel about their respective vertical retention member 2 such that all of the directional locking casters 1 are in the unlocked position. This is especially advantageous for moving a hospital bed or moving a cart in a limited space.

In one embodiment, a cart including four directional locking casters 1 includes a releasing mechanism to unlock all of the casters. In this embodiment, one end of the tensioning rod 19 includes an eyelet 20 through which a release cable 31 can be attached. The release cable is attached to a cable release bar 33. Pulling on the cable release bar 33 pulls against the tensioning rod 19 to disengage the locking device 12. When the rod 19 is pulled by manually applying the cable release bar 33, the locking ball 16 is no longer held in position in the detent 14 in the circular ring 7. Thusly, all of the directional locking casters 1 can be maintained in the unlocked position if the cable release bar 33 is held. A cart including the cable release mechanism can, for example, turn a sharp curve or move in a tight narrow room. This feature would be advantageous for turning a heavily loaded cart in a tight narrow area.

OTHER EMBODIMENTS

All of the features disclosed in this specification may be combined in any combination. Each feature disclosed in this specification may be replaced by an alternative feature serving the same, equivalent, or similar purpose. Thus, unless expressly stated otherwise, each feature disclosed is only an example of a generic series of equivalent or similar features.

From the above description, a person skilled in the art can easily ascertain the essential characteristics of the present invention, and without departing from the spirit and scope thereof, can make various changes and modifications of the present invention to adapt it to various usages and conditions. Thus, other embodiments are also within the claims.

The invention claimed is:

1. A directional locking caster having a locked position and an unlocked position, the caster comprising:
    a wheel assembly including a wheel having a wheel axle and a fork for supporting the wheel axle, the fork having an upper end and a lower end, the wheel axle being affixed to the lower end and a circular ring being affixed to the upper end, the circular ring including a detent;
    a thrust bearing assembly having a central opening, the thrust bearing assembly including an outer bearing ring and an inner bearing ring, the outer bearing ring having a mounting member protruding therefrom;
    a vertical retention member extending through the central opening of the thrust bearing assembly, the vertical retention member defining a vertical axis, the vertical axis being perpendicular to and offset horizontally from the wheel axle; and
    a locking device including a tubular housing having a first end and a second end, the first end and the second end defining an axis therebetween, a ball socket at the first end and a tension adjusting plug positioned at the second end, a tensioning rod within the tubular housing, the tensioning rod having a proximal end and a distal end, and a locking ball in contact with the proximal end of the tensioning rod and extending through the ball socket,
wherein the fork is rotatably connected to the vertical retention member, the locking device is mounted on the mounting member such that the locking device extends in a direction away from the vertical retention member and the axis is perpendicular to the vertical axis, the locking ball reversibly engages the detent in the circular ring, and, in the locked position, the fork cannot rotate about the vertical retention member.

2. The directional locking caster of claim 1, wherein the locking device is configured such that application of a lateral force to the wheel converts the directional locking caster from the locked position to the unlocked position.

3. The directional locking caster of claim 1, wherein, in the locked position, the locking ball is engaged in the detent in the circular ring, the wheel axle is perpendicular to the axis of the locking device and is offset horizontally from the vertical axis in a direction away from the locking device.

4. The directional locking caster of claim 3, wherein, in the locked position, the locking ball extends through the ball socket by a distance of one third of the diameter of the locking ball.

5. The directional locking caster of claim 1, wherein, in the unlocked position, the locking ball is not engaged in the detent in the circular ring.

6. The directional locking caster of claim 1, further comprising a tension spring mounted about the tensioning rod, the tension spring contacting the tension adjusting plug and the proximal end of the tensioning rod.

7. The directional locking caster of claim 1, wherein the tension adjusting plug includes threads on an outer surface, the threads reversibly engaging threads located on an inner surface of the second end of the tubular housing.

8. A transport device comprising a platform and the directional locking caster of claim 1, wherein the directional locking caster is fastened to the platform via the vertical retention member and the locking device is configured such that application of a lateral force to the wheel converts the directional locking caster from the locked position to the unlocked position.

9. The transport device of claim 8, wherein the platform is square or rectangular and has a first edge and a second edge parallel to each other defining a centerline therebetween, and the device includes four directional locking casters each being fastened to the platform proximate a different corner such that each locking device is parallel to the first edge of the platform, each locking device extending in a direction towards the centerline.

10. The transport device of claim 9, wherein the transport device is a bed or a shopping cart.

11. The transport device of claim 8, further comprising a cable release bar and a release cable having a first end and a second end; the first end attached to an eyelet at the distal end of the tensioning rod and the second end attached to the cable release bar, wherein activation of the cable release bar disengages the locking device.

12. The transport device of claim 11, wherein the transport device is a bed or a shopping cart.

13. The transport device of claim 8, wherein the transport device is a bed or a shopping cart.

14. A transport device comprising a platform and the directional locking caster of claim 1, wherein the directional locking caster is fastened to the platform via the mounting member and the locking device is configured such that application of a lateral force to the wheel converts the directional locking caster from the locked position to the unlocked position.

15. The transport device of claim 14, wherein the platform is square or rectangular and has a first edge and a second edge parallel to each other defining a centerline therebetween, and the device includes four directional locking casters each being fastened to the platform proximate a different corner such that each locking device is parallel to the first edge of the platform, each locking device extending in a direction towards the centerline.

16. The transport device of claim 15, wherein the transport device is a bed or a shopping cart.

17. The transport device of claim 14, further comprising a cable release bar, and a release cable having a first end and a second end; the first end attached to an eyelet at the distal end of the tensioning rod and the second end attached to the cable release bar, wherein activation of the cable release bar disengages the locking device, thereby converting the directional locking caster from the locked position to the unlocked position.

18. The transport device of claim 17, wherein the transport device is a bed or a shopping cart.

19. The transport device of claim 14, wherein the transport device is a bed or a shopping cart.

\* \* \* \* \*